(12) United States Patent
Lin et al.

(10) Patent No.: US 11,630,210 B2
(45) Date of Patent: Apr. 18, 2023

(54) METHOD FOR CREATING OCCUPANCY GRID MAP AND PROCESSING APPARATUS

(71) Applicant: BEIJING TUSEN ZHITU TECHNOLOGY CO., LTD., Beijing (CN)

(72) Inventors: Xuan Lin, Beijing (CN); Naiyan Wang, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 533 days.

(21) Appl. No.: 16/711,231

(22) Filed: Dec. 11, 2019

(65) Prior Publication Data
US 2020/0183011 A1  Jun. 11, 2020

(30) Foreign Application Priority Data
Dec. 11, 2018  (CN) .......................... 201811511157.5

(51) Int. Cl.
*G01S 17/89* (2020.01)
*G05D 1/00* (2006.01)
*G01C 21/00* (2006.01)

(52) U.S. Cl.
CPC .......... *G01S 17/89* (2013.01); *G01C 21/3881* (2020.08); *G05D 1/0088* (2013.01); *G05D 2201/0213* (2013.01)

(58) Field of Classification Search
CPC ...... G06V 20/56; G06K 9/6277; G01S 13/89; G01S 17/04; G08G 1/20; G01C 21/32
See application file for complete search history.

(56) References Cited

U.S. PATENT DOCUMENTS

| 7,446,766 | B2 * | 11/2008 | Moravec | G05D 1/0274 352/57 |
| 7,912,583 | B2 * | 3/2011 | Gutmann | G06V 20/10 700/258 |
| 8,427,472 | B2 * | 4/2013 | Moravec | G05D 1/0274 435/325 |

(Continued)

FOREIGN PATENT DOCUMENTS

CN        108920584 A    11/2018

OTHER PUBLICATIONS

A comparison of position estimation using occupancy grids; Schiele—1994. (Year: 1994).*

(Continued)

*Primary Examiner* — Luis Perez-Fuentes
(74) *Attorney, Agent, or Firm* — Paul Liu; Julie J. Muyco; Perkins Coie, LLP

(57) ABSTRACT

The present disclosure provides a method and an apparatus for creating an occupancy grid map, as well as a processing apparatus. The method includes: creating a current occupancy grid map based on a location of the vehicle and a previous occupancy grid map; and determining a current probability that each grid in the current occupancy grid map belongs to each of occupancy categories based on last environment perception information received from the sensors and updating an occupancy category to which each grid in the current occupancy grid map belongs based on the current probability that the grid belongs to each of the occupancy categories, in accordance with an asynchronous updating policy.

20 Claims, 7 Drawing Sheets

---

E1: Map each grid in the current occupancy grid map onto the last image received from the vehicle mounted camera to obtain a pixel corresponding to each grid E2: Apply semantic segmentation to the image to obtain semantic information of each pixel E3: For each grid: determine a current observed probability that the grid belongs to each of the occupancy categories based on the semantic information of the pixel corresponding to the gird, and determine the current probability that the grid belongs to each of the occupancy categories based on a previous probability that the grid belongs to the occupancy category and the current observed probability that the grid belongs to the occupancy category E4: Update the occupancy category to which each grid in the current occupancy grid map belongs based on the current probability that the grid belongs to each of the occupancy categories

(56) References Cited

U.S. PATENT DOCUMENTS

| | | | |
|---|---|---|---|
| 10,354,150 B2* | 7/2019 | Yamazaki | H04N 13/254 |
| 10,488,507 B2* | 11/2019 | Adachi | G01S 13/931 |
| 10,613,546 B2* | 4/2020 | Aghamohammadi | G05D 1/0274 |
| 2016/0378115 A1 | 12/2016 | Yoo et al. | |
| 2017/0116487 A1 | 4/2017 | Yamazaki et al. | |
| 2018/0345958 A1 | 12/2018 | Lo et al. | |

OTHER PUBLICATIONS

Learning occupancy grid maps with forward sensor models; Thrun—2003. (Year: 2003).*

Probabilistic Autonomous Robot Navigation in Dynamic Environments; Foka—2010. (Year: 2010).*

English translation from corresponding Chinese Patent Application No. 201811511157.5, dated Mar. 2, 2023 (37 pages).

* cited by examiner

US 11,630,210 B2

METHOD FOR CREATING OCCUPANCY GRID MAP AND PROCESSING APPARATUS

CROSS-REFERENCE TO RELATED APPLICATION(S)

This patent document claims priority to and benefits of Chinese Application Number 201811511157.5 that was filed on Dec. 11, 2018. The entire content of the before-mentioned patent application is incorporated by reference as part of the disclosure of this application.

TECHNICAL FIELD

The present disclosure relates to artificial intelligence, and more particularly, to a method for creating an occupancy grid map and a processing apparatus.

BACKGROUND

Occupancy grid map is the most commonly used map creation method in the field of artificial intelligence (e.g., self-driving vehicles, robotics or the like). A map can be divided into grids at a certain resolution. A probability that each grid in the occupancy grid map is occupied can be estimated based on environment information reported from sensors, as basis for path planning.

Conventionally, an occupancy grid map is a binary map, i.e., each grid can have one of only two states: occupied or free space.

Conventionally, an occupancy grid map can be updated typically by determining whether each grid in the occupancy grid map contains an obstacle based on laser point cloud data fed back from a laser radar and, if so, setting the state of the grid to occupied, or otherwise setting the state of the grid to free space. However, since the laser radar has problems such as a short range and a sparse detection result, the updating of the occupancy grid map depending on the laser radar as the sole sensor may be highly nondeterministic, i.e., the occupancy grid map may not be updated effectively and accurately. Further, once the laser radar fails due to some malfunction, the occupancy grid map would not be updated, which may affect subsequent operations.

SUMMARY

According to an embodiment of the present disclosure, a method for creating an occupancy grid map is provided. At least one sensor is provided on a vehicle. The method includes: creating a current occupancy grid map based on a location of the vehicle and a previous occupancy grid map; and determining a current probability that each grid in the current occupancy grid map belongs to each of occupancy categories based on last environment perception information received from the sensor, and updating an occupancy category to which each grid in the current occupancy grid map belongs based on the current probability that the grid belongs to each of the occupancy categories, in accordance with an asynchronous updating policy.

According to an embodiment of the present disclosure, an apparatus for creating an occupancy grid map is provided. The apparatus is communicatively connected to a vehicle mounted positioning device and at least two sensors provided on a vehicle. The apparatus includes: a first communication unit configured to receive a location of the vehicle from the vehicle mounted positioning device and transmit the location of the vehicle to a map creation unit; a second communication unit configured to receive environment perception information from the sensors and transmit the environment perception information to the map creation unit; and the map creation unit configured to create a current occupancy grid map based on the location of the vehicle and a previous occupancy grid map, and determine a current probability that each grid in the current occupancy grid map belongs to each of occupancy categories based on last environment perception information received from the sensors, and update an occupancy category to which each grid in the current occupancy grid map belongs based on the current probability that the grid belongs to each of the occupancy categories, in accordance with an asynchronous updating policy.

According to an embodiment of the present disclosure, a processing apparatus is provided. The processing apparatus includes a memory and one or more processors communicatively connected to the memory. The memory stores instructions executable by the one or more processors. The instructions, when executed by the one or more processors, cause the one or more processors to perform the above method for creating an occupancy grid map.

According to an embodiment of the present disclosure, a non-volatile storage medium is provided. The non-volatile storage medium stores at least one machine executable instruction which, when executed by a processor, causes the processor to perform the above method for creating an occupancy grid map.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In the solutions according to the present disclosure, a plurality of sensors can be provided depending on actual requirements as can be appreciated by those skilled in the art. In accordance with an asynchronous updating policy, updating of an occupancy grid map can be triggered asynchronously based on environment perception information collected by the sensors. With the solutions according to the present disclosure, since different sensors may have different collecting angles, fields of view and types, the environment perception information collected by the sensors can be richer and more comprehensive. Thus, the occupancy grid map can be updated asynchronously based on the environment perception information collected by the plurality of sensors. On one hand, richer and more comprehensive environment perception information can be provided for updating the occupancy grid map, such that the accuracy of the occupancy grid map can be improved. On the other hand, it is possible to increase the frequency at which the occupancy grid map is updated, so as to improve the timeliness of the updating of the occupancy grid map, satisfy the requirements of real-time features in the field of automated driving and enhance the stability of the state of the occupancy grid map.

Embodiment 1

Figure 1:
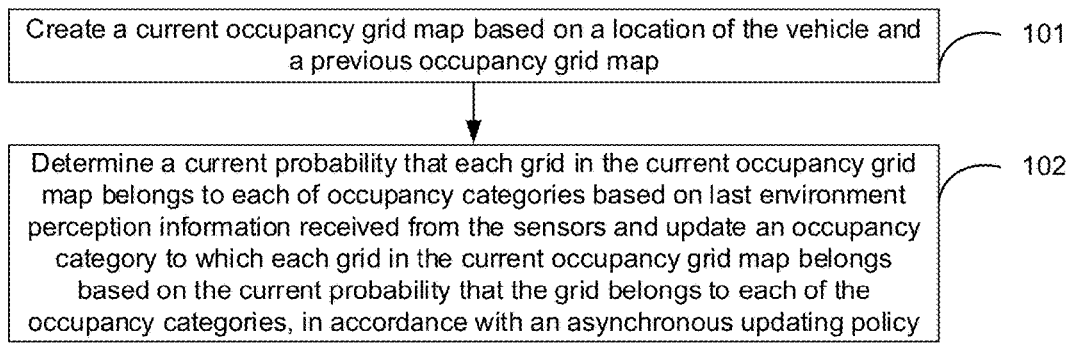
FIG. 1 is a first flowchart illustrating a method for creating an occupancy grid map according to an embodiment of the present disclosure.

FIG. 1 is a flowchart illustrating a method for creating an occupancy grid map according to an embodiment of the present disclosure. At least two sensors are provided on a vehicle. The sensors can be of a same type or different types. The present disclosure is not limited to any type, structure or model of the sensors. The sensors can be of any of various types, including vehicle mounted cameras, laser radars, millimeter wave radars and the like. For example, the sensors may all be vehicle mounted cameras or all be laser radars, or some of the sensor may be vehicle mounted cameras while others may be laser radars. The method includes the following steps.

At step 101, a current occupancy grid map is created based on a location of the vehicle and a previous occupancy grid map.

At step 102, in accordance with an asynchronous updating policy, a current probability that each grid in the current occupancy grid map belongs to each of occupancy categories is determined based on last environment perception information received from the sensors, and an occupancy category to which each grid in the current occupancy grid map belongs is updated based on the current probability that the grid belongs to each of the occupancy categories.

Figure 2:
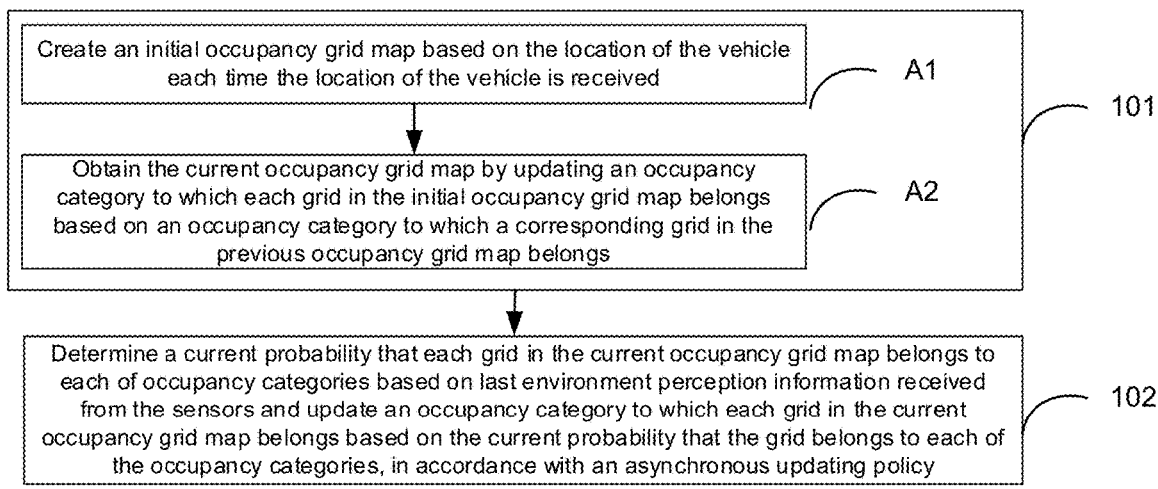
FIG. 2 is a second flowchart illustrating a method for creating an occupancy grid map according to an embodiment of the present disclosure.
Figure 3:
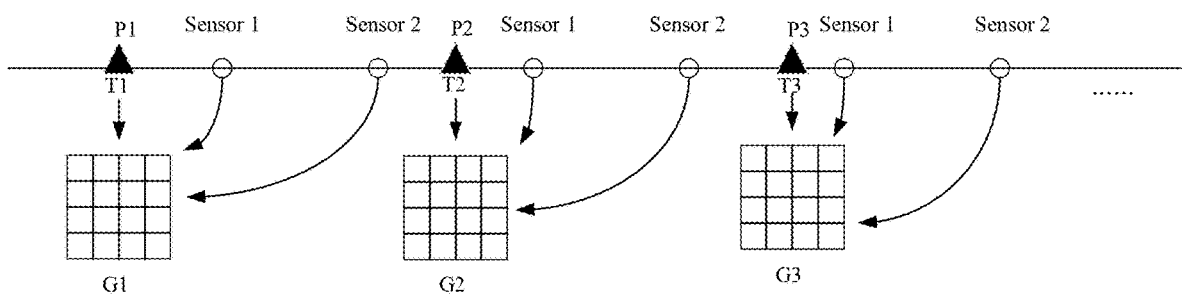
FIG. 3 is a schematic diagram showing an occupancy grid map created using the process flow shown in FIG. 2 according to an embodiment of the present disclosure.

In some optional embodiments, the above step 101 of creating the current occupancy grid map based on the location of the vehicle and the previous occupancy grid map may be implemented in the following steps A1~A2, as shown in FIGS. 2 and 3.

At step A1, an initial occupancy grid map is created based on the location of the vehicle each time the location of the vehicle is received.

At step A2, the current occupancy grid map is obtained by updating an occupancy category to which each grid in the initial occupancy grid map belongs based on an occupancy category to which a corresponding grid in the previous occupancy grid map belongs.

As shown in FIG. 3, each time a location of the vehicle is received, an occupancy grid map is created. For example, a location P1 of the vehicle is received at time T1, a current occupancy grid map G1 is created based on the location P1 of the vehicle. Before time T2, G1 is updated based on the environment perception information received from the sensors between the time T1 and the time T2. A location P2 of the vehicle is received at the time T2, a current occupancy grid map G2 is created based on the location P2 of the vehicle. At this time, G1 becomes the previous occupancy grid map. Before time T3, G2 is updated based on the environment perception information received from the sensors between the time T2 and the time T3. A location P3 of the vehicle is received at the time T3, a current occupancy grid map G3 is created based on the location P3 of the vehicle. At this time, G2 becomes the previous occupancy grid map. Before time T4, G3 is updated based on the environment perception information received from the sensors between the time T3 and the time T4, and so on. Sensor 1 and Sensor 2 are used in this example.

Figure 4:
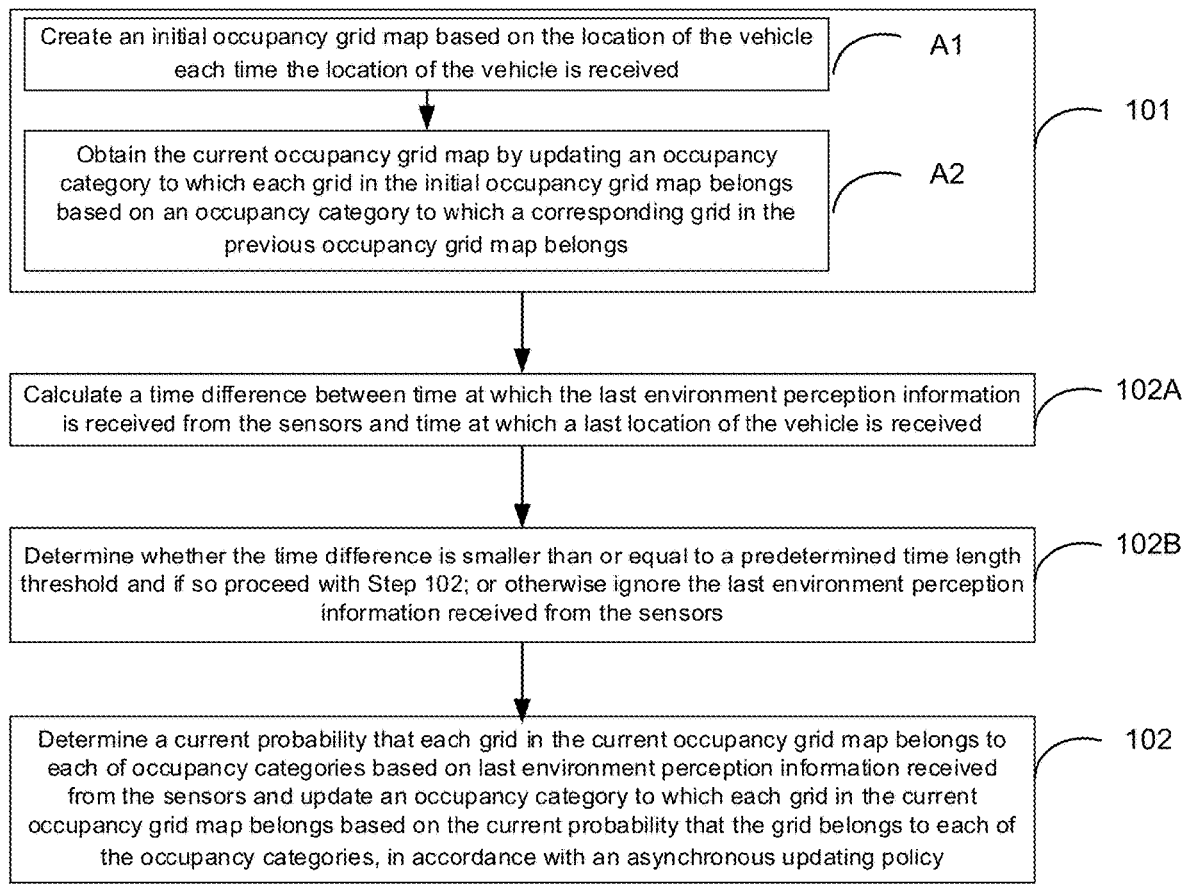
FIG. 4 is a third flowchart illustrating a method for creating an occupancy grid map according to an embodiment of the present disclosure.
Figure 5:
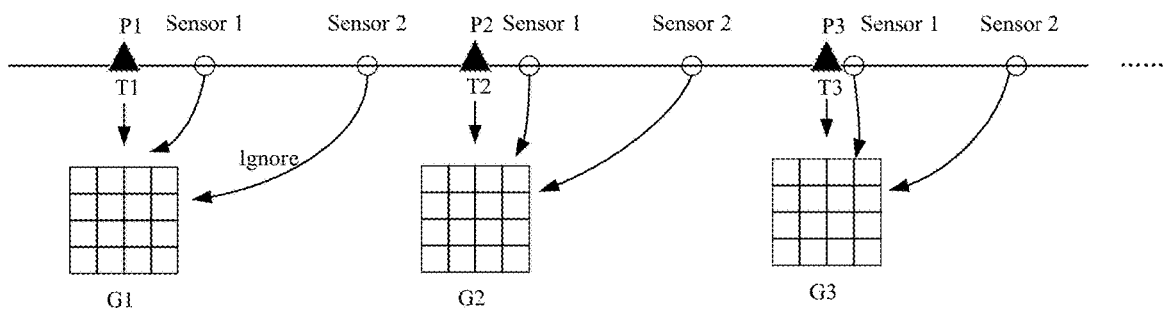
FIG. 5 is a schematic diagram showing an occupancy grid map created using the process flow shown in FIG. 4 according to an embodiment of the present disclosure.

The process flow shown in FIG. 2 can further include steps 102A-102B before the above step 102, as shown in FIGS. 4 and 5.

At step 102A, a time difference between time at which the last environment perception information is received from the sensors and time at which a last location of the vehicle is received is calculated.

At step 102B, it is determined whether the time difference is smaller than or equal to a predetermined time length threshold. If so, the process proceeds with step 102; or otherwise the last environment perception information received from the sensors is ignored.

As shown in FIG. 5, each time a location of the vehicle is received, an occupancy grid map is created. For example, a location P1 of the vehicle is received at time T1, a current occupancy grid map G1 is created based on the location P1 of the vehicle. Before time T2, each time when environment perception information is received from one of the sensors between the time T1 and the time T2, it is determined whether a time difference between the time at which the environment perception information is received and the time T1 is larger than a predetermined time length threshold. If so, the environment perception information is ignored, without updating G1; or otherwise G1 is updated based on the environment perception information. A location P2 of the vehicle is received at the time T2, a current occupancy grid map G2 is created based on the location P2 of the vehicle. At this time, G1 becomes the previous occupancy grid map. Before time T3, each time when environment perception information is received from one of the sensors between the time T2 and the time T3, it is determined whether a time difference between the time at which the environment perception information is received and the time T2 is larger than a predetermined time length threshold. If so, the environment perception information is ignored, without updating G2; or otherwise G2 is updated based on the environment perception information. A location P3 of the vehicle is received at the time T3, a current occupancy grid map G3 is created based on the location P3 of the vehicle. At this time, G2 becomes the previous occupancy grid map. Before time T4, each time when environment perception information is received from one of the sensors between the time T3 and the time T4, it is determined whether a time difference between the time at which the environment perception information is received and the time T3 is larger than a predetermined time length threshold. If so, the environment perception information is ignored, without updating G3; or otherwise G3 is updated based on the environment perception information, and so on. Sensor 1 and Sensor 2 are used in this example.

Figure 6:
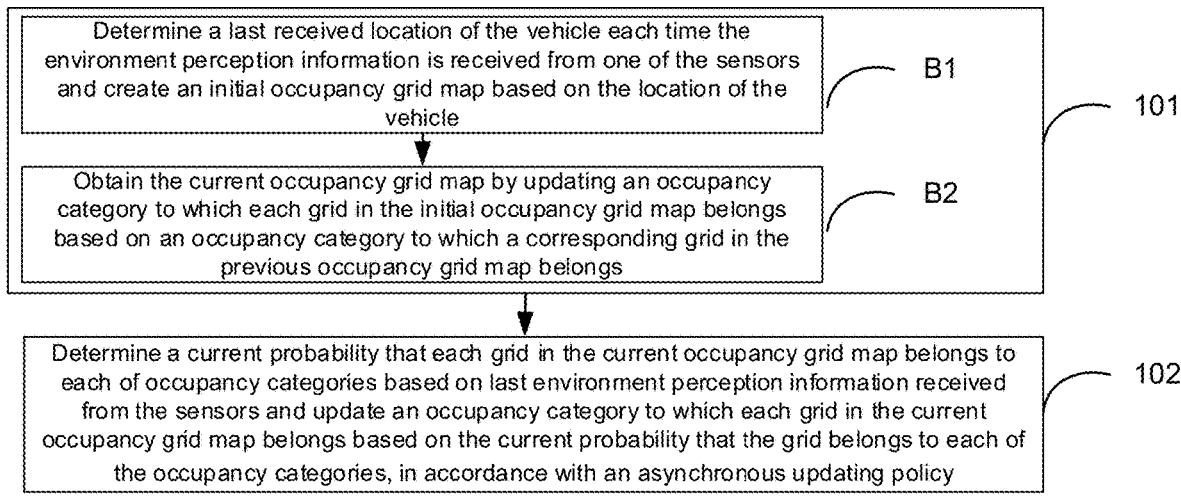
FIG. 6 is a flowchart illustrating a method for creating a current occupancy grid map according to an embodiment of the present disclosure.
Figure 7:
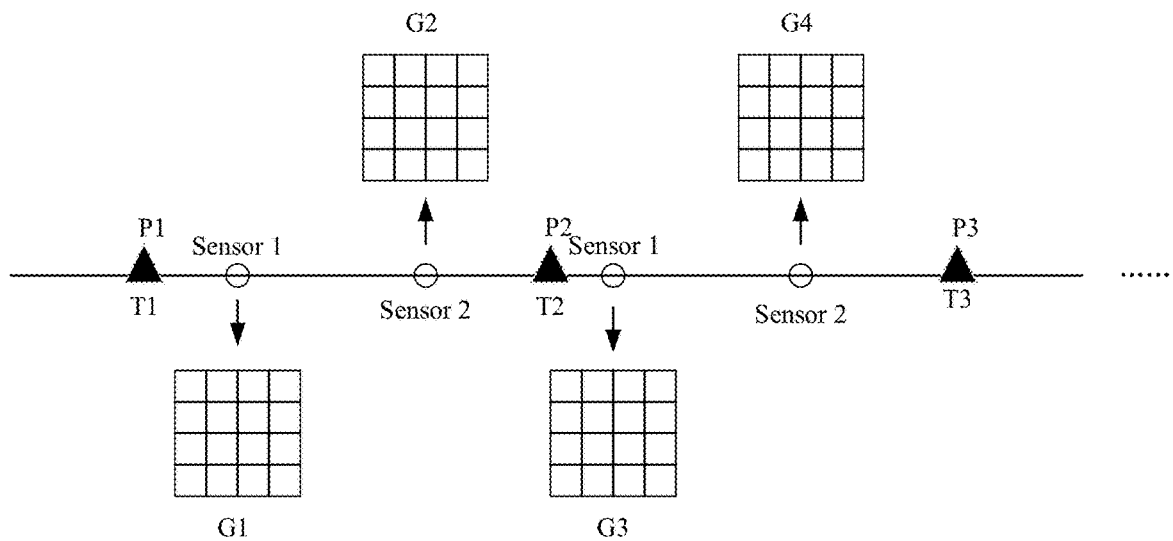
FIG. 7 is a schematic diagram showing an occupancy grid map created using the process flow shown in FIG. 6 according to an embodiment of the present disclosure.

In some optional embodiments, the above step 101 of creating the current occupancy grid map based on the location of the vehicle and the previous occupancy grid map may be implemented in the following steps B1~B2, as shown in FIGS. 6 and 7.

At step B1, a last received location of the vehicle is determined each time the environment perception information is received from one of the sensors, and an initial occupancy grid map is created based on the location of the vehicle.

At step B2, the current occupancy grid map is obtained by updating an occupancy category to which each grid in the initial occupancy grid map belongs, based on an occupancy category to which a corresponding grid in the previous occupancy grid map belongs.

In some optional embodiments, in the above steps A1 and B1, the operation of creating the initial occupancy grid map based on the location of the vehicle may be implemented in the following steps C1~C3.

At step C1, a first occupancy grid map is created in a vehicle body coordinate system based on the location of the vehicle.

At step C2, an initial height value is assigned to each grid in the first occupancy grid map based on a height of an origin of the vehicle body coordinate system with respect to a ground.

In the step C2, the initial height value of each grid in the first occupancy grid map can be set to a height of the vehicle body coordinate system with respect to the ground.

At step C3, the initial occupancy grid map is obtained by modifying the initial height value of each grid in the first occupancy grid map based on a predetermined terrain map.

As shown in FIG. 7, each time when environment perception information is received from one of the sensors, an occupancy grid map is created. For example, when environment perception information a is received from a sensor at time t1, a last location of the vehicle received before the time t1 is determined as a location P1 of the vehicle received at time T1, and a current occupancy grid map G1 is created based on the location P1 of the vehicle and updated based on the environment perception information a. When environment perception information b is received from another sensor at time t2, a last location of the vehicle received before the time t2 is determined as the location P1 of the vehicle received at time T1, and a current occupancy grid map G2 is created based on the location P1 of the vehicle. At this time, G1 is the previous occupancy grid map and G2 updated based on the environment perception information b. When environment perception information c is received from a sensor at time t3, a last location of the vehicle received before the time t3 is determined as a location P2 of the vehicle received at time T2, and a current occupancy grid map G3 is created based on the location P2 of the vehicle. At this time, G2 is the previous occupancy grid map and G3 updated based on the environment perception information c. When environment perception information d is received from a sensor at time t4, a last location of the vehicle received before the time t4 is determined as the location P2 of the vehicle received at time T2, and a current occupancy grid map G4 is created based on the location P2 of the vehicle. At this time, G3 is the previous occupancy grid map and G4 updated based on the environment perception information d, and so on. Sensor 1 and Sensor 2 are used in this example.

In some optional embodiments, an Inertial Measurement Unit (IMU) coordinate system of an IMU mounted on the vehicle can be used as the vehicle body coordinate system. The origin of the vehicle body coordinate system is the origin of the IMU coordinate system, which can be a position at which the IMU is mounted.

Figure 8:
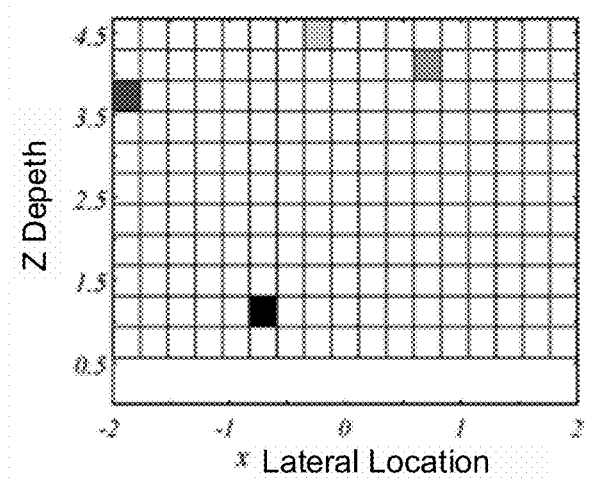
FIGS. 8 and 9 are schematic diagrams each showing an occupancy grid map created according to an embodiment of the present disclosure.
Figure 9:
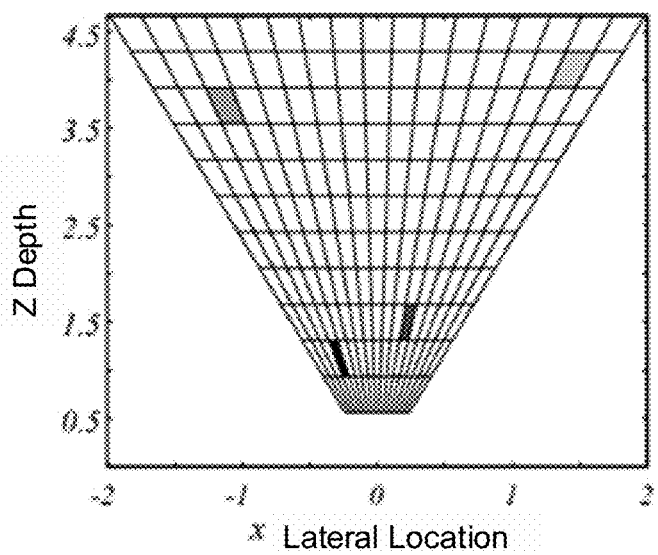

In some optional embodiments, a Cartesian coordinate system or a polar coordinate system can be used as the vehicle body coordinate system. For example, an occupancy grid map can be created in a Cartesian coordinate system, with the location of the vehicle being the origin, and the grids are distributed uniformly and all the girds have the same accuracy, as shown in FIG. 8. Alternatively, an occupancy grid map can be created in a polar coordinate system, with the current location of the vehicle being the origin, and the grids along one radial line have the same angle with respect to the horizontal direction, but the grids closer to the origin have higher accuracy, as shown in FIG. 9. The present disclosure is not limited to any specific scheme for creating the occupancy grid map.

In some optional embodiments, in the steps A1 and B1, the operation of creating the initial occupancy grid map based on the location of the vehicle may be implemented in the following step D1 of creating the initial occupancy grid map based on the location of the vehicle in a terrain map, which is a pre-created map containing geographical information such as altitudes. In an embodiment of the present disclosure, the coordinate system of the terrain map can be an earth coordinate system or an East-North-Up (ENU) coordinate system.

In order to describe how to update the occupancy grid map using different sensors in further detail, in the following, the sensors are assumed to be vehicle mounted cameras and/or laser radars as an example. The sensors can all be vehicle mounted cameras, all be laser radars, or can include both vehicle mounted cameras and laser radars.

Example 1

In Example 1, at least one of the sensors is a vehicle mounted camera configured to capture an image as the environment perception information. The last received environment perception information is an image received from the vehicle mounted camera. The above step 102 shown in FIG. 1 can be implemented using a process flow shown in FIG. 10. The process flow includes the following steps.

At step E1, each grid in the current occupancy grid map is mapped onto the last image received from the vehicle mounted camera to obtain a pixel corresponding to each grid.

At step E2, semantic segmentation is applied to the image to obtain semantic information of each pixel.

At step E3, for each grid: a current observed probability that the grid belongs to each of the occupancy categories is determined based on the semantic information of the pixel corresponding to the gird, and the current probability that the grid belongs to each of the occupancy categories is determined based on a previous probability that the grid belongs to the occupancy category and the current observed probability that the grid belongs to the occupancy category.

At step E4, the occupancy category to which each grid in the current occupancy grid map belongs is updated based on the current probability that the grid belongs to each of the occupancy categories.

Figure 10:
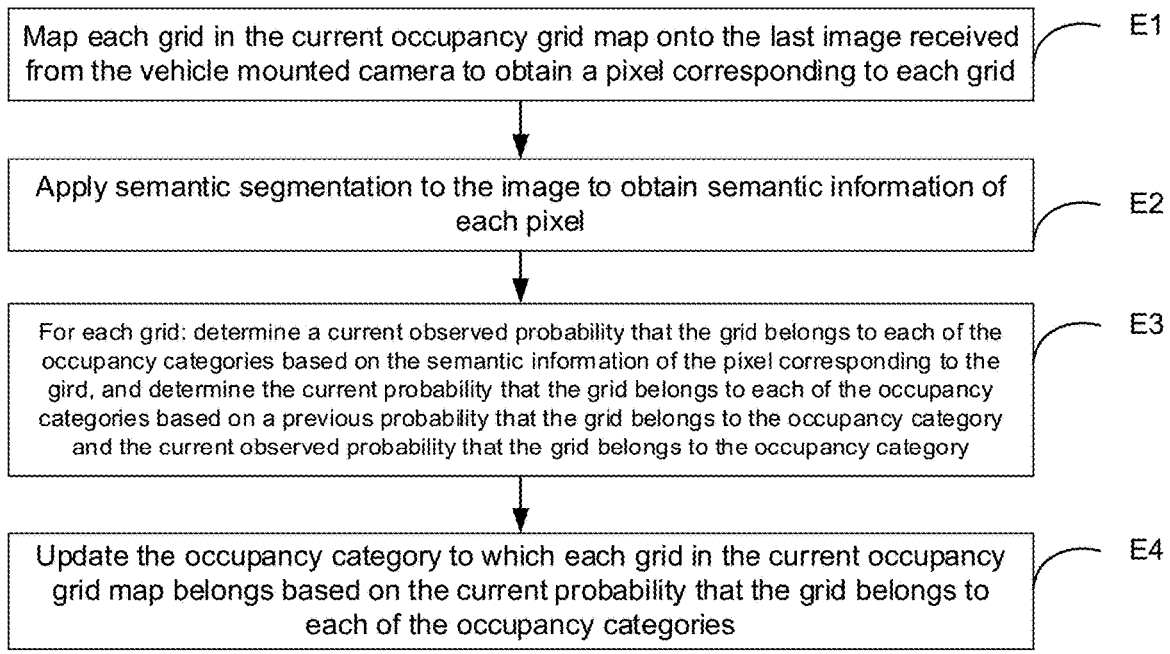
FIG. 10 is a flowchart illustrating a method for updating a current occupancy grid map based on an image received from a vehicle mounted camera according to an embodiment of the present disclosure.

In FIG. 10, the steps E1 and E2 are not necessarily performed in any strict order. The step E1 can be performed before, after or in parallel with the step E2. The present disclosure is not limited to any specific order.

In Example 1, if an initial occupancy grid map is created using the above steps C1~C3, the step E1 of mapping each grid in the current occupancy grid map onto the last image received from the vehicle mounted camera may include: converting the current occupancy grid map into a camera coordinate system of the vehicle mounted camera based on an external reference between the predetermined vehicle body coordinate system and the camera coordinate system; and mapping the current occupancy grid map in the camera coordinate system onto the image based on an internal reference of the vehicle mounted camera, to obtain the pixel corresponding to each grid.

In Example 1, if an initial occupancy grid map is created using the above step D1, the step E1 of mapping each grid in the current occupancy grid map onto the last image received from the vehicle mounted camera may include: determining an external reference between a coordinate system of the terrain map and a camera coordinate system of the vehicle mounted camera; converting the current occupancy grid map into the camera coordinate system of the vehicle mounted camera based on the external reference; and mapping the current occupancy grid map in the camera coordinate system onto the image based on an internal reference of the vehicle mounted camera, to obtain the pixel corresponding to each grid.

In Example 1, optionally, in the step E2, the semantic segmentation can be applied to the image using a semantic segmentation neural network, so as to obtain a representative characteristic value for each pixel in the image to belong to each of semantic categories. The semantic information is a representative characteristic value for the pixel to belong to each of semantic categories. The above step E3 of determining the current observed probability that the grid belongs to each of the occupancy categories based on the semantic information of the pixel corresponding to the gird can be implemented using the following steps E31~E32.

At step E31, a probability that the pixel corresponding to the grid belongs to each of the semantic categories is determined based on the representative characteristic value for the pixel to belong to the semantic category.

At step E32, for each of the occupancy categories: a target semantic category corresponding to the occupancy category is determined based on a predetermined correspondence between the semantic categories and the occupancy categories, and a sum of the probabilities that the pixel belongs to respective target semantic categories is used as the current observed probability that the grid belongs to the occupancy category.

In an embodiment of the present disclosure, the representative characteristic value for a pixel to belong to each of semantic categories refers to a measurement of a possibility that semantics of the pixel belong to a semantic category and can be represented by e.g., a fraction. For example, the semantic categories may include Vehicle, Motorcycle, Bicycle, and Human, and the representative characteristic values for semantics of the pixel to belong to Vehicle, Motorcycle, Bicycle, and Human may be 6, 2, 1, and 1, respectively. In an example, when the semantic segmentation is applied to the image using a semantic segmentation neural network in the step E2, the representative characteristic value for a pixel to belong to each of semantic categories can be an input value to a softmax layer of the semantic segmentation neural network.

For example, the semantic categories may include Vehicle, Motorcycle, Bicycle, Human, Ground, Tree, Streetlight, Traffic Light, Curb, and Fence. The occupancy categories may include a ground category, a static object category and a dynamic object category. The predetermined correspondence between the semantic categories and the occupancy categories may be as follows: Vehicle, Motorcycle, Bicycle, and Human correspond to the dynamic object category, Ground corresponds to the ground category, and Tree, Streetlight, Traffic Light, Curb, and Fence correspond to the static object category. Assuming that the probabilities that a pixel belongs to Vehicle, Motorcycle, Bicycle, Human, Ground, Tree, Streetlight, Traffic Light, Curb, and Fence are 94%, 2%, 1%, 1%, 0.8%, 0.2%, 0.1%, 0.2%, 0.6%, and 0.1%, respectively, the probabilities that the grid corresponding to the pixel belongs to the dynamic object category, the static object category, and the ground category are 98%, 1.2%, and 0.8%, respectively.

In an example, in the above step E31, a probability that a pixel belongs to each of semantic categories can be determined according to the following Equation (1):

$$P_{(y=i)} = \frac{e^{Z_i}}{\sum_j e^{Z_j}} \quad (1)$$

where $P_{(y=i)}$ is the probability that the pixel belongs to the i-th semantic category, and Zi is the representative characteristic value for the pixel to belong to the i-th semantic category.

The semantics of each grid depend on the semantic information of the pixel corresponding to the grid and, for one vehicle mounted camera, a segmentation result for a near scene is more reliable than a segmentation result for a far scene. Thus, in order to improve the accuracy of the semantic segmentation result for the pixel corresponding to each grid, in an example, in calculating the probability that the pixel corresponding to the grid belongs to each of the semantic categories in the above step E31, a temperature parameter T of the grid can be introduced. The temperature parameter T is a function of a distance d between the grid and the vehicle mounted camera and is proportional to d. Thus, in the above step E31, the probability that the pixel belongs to each of the semantic categories can be determined according to the following Equation (2):

$$P_{(y=i)} = \frac{e^{\frac{Z_i}{T}}}{\sum_j e^{\frac{Z_j}{T}}} \qquad (2)$$

where $P_{(y=i)}$ is the probability that the pixel belongs to the i-th semantic category, Zi is the representative characteristic value for the pixel to belong to the i-th semantic category, T is a function of a distance d between the grid and the vehicle mounted camera and is proportional to d.

In some optional embodiments, the above step E32 can be implemented using the following steps E321~E322.

At step E321, a weight for the previous probability that the grid belongs to the occupancy category and a weight for the current observed probability that the grid belongs to the occupancy category are determined based on the previous probability that the grid belongs to the occupancy category, the current observed probability that the grid belongs to the occupancy category and a time interval between a previous observation and a current observation of the current occupancy grid map.

At step E322, for each of the occupancy categories: a weighted sum of the previous probability that the grid belongs to the occupancy category and the current observed probability that the grid belongs to the occupancy category is calculated, so as to obtain the current probability that the grid belongs to the occupancy category.

In an example, in an embodiment of the present disclosure, the occupancy categories may include a dynamic object category, a static object category and a ground. The previous probabilities that the grid belongs to the dynamic object category, the static object category and the ground are represented as $p(D|Z_{1:t-\Delta t})$, $p(S|Z_{1:t-\Delta t})$, and $p(R|Z_{1:t-\Delta t})$, respectively. The current observed probabilities that the grid belongs to the dynamic object category, the static object category and the ground are represented as $p(D|z_t)$, $p(S|z_t)$, and $p(R|z_t)$, respectively. In the above step E321, the weight for the previous probability that the grid belongs to each occupancy category and the weight for the current observed probability that the grid belongs to each occupancy category can be calculated according to the following Equation (3):

$$w_{t-\Delta t} = \max\left(\varepsilon, e^{\frac{\Delta t}{\tau}} \cdot \max(p(S \mid z_{1:t-\Delta t}), p(S \mid z_t))\right) \qquad (3)$$

$$w_t = 1 - w_{t-\Delta t}$$

where $W_{t-\Delta t}$ is the weight for the previous probability, $w_t$ is the weight for the current observed probability, t denotes the time of the current observation, $\Delta t$ denotes the time interval between the previous observation and the current observation, ε is a predetermined minimum weight for the previous probability for smoothing the output, and τ is a predetermined empirical value.

In an example, when there is a plurality of occupancy categories, a sum of the previous probabilities that the grid belongs to the static object categories among the plurality of occupancy categories can be used as $p(S|Z_{1:t-\Delta t})$ in Equation (3), so as to obtain the weight for the previous probability that the grid belongs to each occupancy category. For example, in an embodiment of the present disclosure, the occupancy categories may include Vehicle, Bicycle, Pedestrian, Curb, Fence, Streetlight, Traffic Light, and Ground, among which Vehicle, Bicycle, and Pedestrian belong to dynamic objects, while Curb, Fence, Streetlight, and Traffic Light belong to static objects. In this case, the previous probability that the grid belongs to each occupancy category can be calculated according to the above Equation (3). Here, $p(S|Z_{1:t-\Delta t})$ in Equation (3) is a sum of the respective previous probabilities that the grid belongs to Curb, Fence, Streetlight, and Traffic Light, and $P(S|z_t)$ is a sum of the respective current observed probabilities that the grid belongs to Curb, Fence, Streetlight, and Traffic Light.

Accordingly, in the step E322, the current probability that the grid belongs to the occupancy category can be calculated according to the following Equation (4):

$$p(i|Z_{1:t}) = W_{t-\Delta t} \cdot p(i| Z_{1:t-\Delta t}) + (1 - W_{t-\Delta t}) \cdot p(i|Z_t) \qquad (4)$$

where $W_{t-\Delta t}$ is the weight for the previous probability that the grid belongs to the i-th occupancy category, $1-W_{t-\Delta t}$ is the weight for the current observed probability that the grid belongs to the i-th occupancy category, $p(i|z_{1:t})$ is the current probability that the grid belongs to the i-th occupancy category, $p(i|Z_{1:t-\Delta t})$ is the previous probability that the grid belongs to the i-th occupancy category, and $p(i|z_t)$ is the current observed probability that the grid belongs to the i-th occupancy category.

Of course, as an alternative, the values of the weights in the step E321 can be set flexibly by those skilled in the art depending on actual requirements. For example, the weight for the previous probability that the grid belongs to each occupancy category and the weight for the current observed probability that the grid belongs to each occupancy category can each be set directly to a predetermined value based on empirical values, instead of being determined according to the above Equation (3).

In some optional embodiments, the above step E32 can be implemented using the following steps E323~E325.

At step E323, a current observed probability that the grid is occupied is obtained based on the current observed probability that the grid belongs to the static object category and the current observed probability that the grid belongs to the dynamic object category.

At step E324, a current observed probability that the grid is occupied is obtained based on the current observed probability that the grid belongs to the static object category and the current observed probability that the grid belongs to the dynamic object category.

At step E325, a current probability that the grid is occupied is determined based on the current observed probability that the grid is occupied and a previous probability that the grid is occupied.

At step E326, the current probability that the grid belongs to each of the occupancy categories is calculated based on the current observed probability that the grid belongs to the static object category, a previous probability that the grid belongs to the static object category, the current observed probability that the grid is occupied, the previous probability that the grid is occupied, the current probability that the grid is occupied and a time interval between a previous observation and a current observation.

In an example, according to an embodiment of the present disclosure, the occupancy categories may include a dynamic object category, a static object category and a ground. The current observed probabilities that the grid belongs to the dynamic object category, the static object category and the ground are represented as $P_{(D)}$, $P_{(s)}$, and $P_{(R)}$, respectively.

The current observed probability that the grid is occupied (i.e., the probability that the grid is occupied as currently observed) is represented as $P_{(O)}$. The current observed probability that the grid is occupied can be calculated according to the following Equation (5):

$$p(O)=p(S)+p(D) \quad (5)$$

p(O) can be transformed, e.g., by calculating a log-odd ratio of p(O) according to the following Equation (6):

$$l(O) = \log\frac{p(O)}{1-p(O)} \quad (6)$$

Assuming that the current probability that the grid is occupied is represented as $p(O|z_{1:t})$, the log-odd ratio of $p(O|z_{1:t})$ is represented as $l(O|z_{1:t})$, the previous probability that the grid is occupied is represented as $p(O|z_{1:t-\Delta t})$, the log-odd ratio of $p(O|z_{1:t-\Delta t})$ is represented as $l(O|z_{1:t-\Delta t})$, and the current observed probability that the grid is occupied is represented as $l(O|z_t)$, the current probability that the grid is occupied can be calculated according to:

$$l(O|z_{1:t})=l(O|z_{1:t-\Delta t})+\lambda l(O|z_t) \quad (7)$$

$$p(O|z_{1:t})=e^{l(O|z_{1:t})}(1+e^{l(O|z_{1:t})}) \quad (8)$$

where λ in Equation (7) is a predetermined constant dependent on a type of the sensor.

Assuming that the current probability that the grid belongs to the static object category is represented as $p(S|z_{1:t})$, the current probability that the grid belongs to the dynamic object category is represented as $p(D|z_{1:t})$, and the previous probability that the grid belongs to the static object category is represented as $p(S|z_{1:t-\Delta t})$, the current probability that the grid belongs to the static object category and the current probability that the grid belongs to the dynamic object category can be calculated according to the following Equations (9) and (10), respectively:

$$p(S|z_{1:t}) = p(O|z_{1:t}) \cdot \frac{w_{t-\Delta t} \cdot p(S|z_{1:t-\Delta t}) + w_t \cdot p(S|z_t)}{w_{t-\Delta t} \cdot p(O|z_{1:t-\Delta t}) + w_t \cdot p(O|z_t)} \quad (9)$$

$$p(D|z_{1:t}) = p(O|z_{1:t}) - p(S|z_{1:t}) \quad (10)$$

where $w_t$ and $w_{t-\Delta t}$ in Equation (9) are the weight for the current observed probability that the grid belongs to the static object category and the weight for the previous probability that the grid belongs to the static object category, respectively, as represented in the following Equation (11):

$$w_{t-\Delta t} = \max(\varepsilon, \max(p(S|z_{1:t-\Delta t}), p(S|z_t)) \cdot e^{-\Delta t/\tau}) \quad (11)$$

$w_t = 1 - w_{t-\Delta t}$ where $\Delta t$ denotes the time interval between the previous observation and the current observation, ε is a predetermined minimum weight for the previous probability for smoothing the output, and τ is a predetermined empirical value.

Example 2

In Example 2, at least one of the sensors is a laser radar configured to capture a laser point cloud as the environment perception information. With a last laser point cloud received from the laser radar, the above step 102 as shown in FIG. 1 can be implemented as follows.

At step F1, a laser point cloud corresponding to each grid in the current occupancy grid map is determined.

At step F2, for each grid: an observed type of a current observation for the grid is determined based on the laser point cloud corresponding to the grid. The current probability that the grid belongs to each of the occupancy categories is determined based on a previous probability that the grid belongs to the occupancy category and the observed type of the current observation for the grid.

At step F3, the occupancy category to which each grid in the current occupancy grid map belongs is updated based on the current probability that the grid belongs to each of the occupancy categories.

Figure 11:
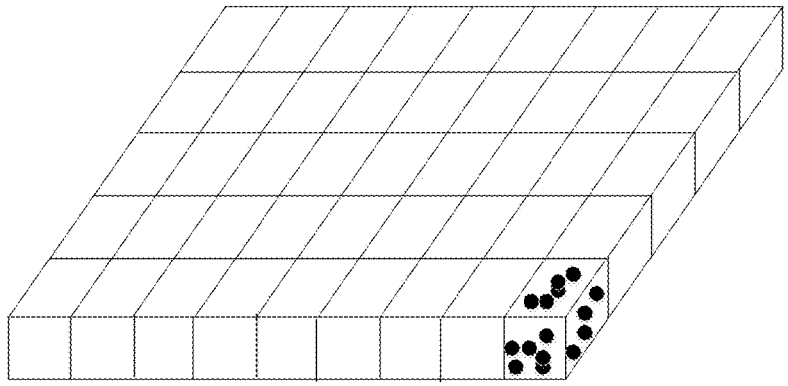
FIG. 11 is a schematic diagram showing laser points corresponding to grids according to an embodiment of the present disclosure.

The above step F1 of determining the laser point cloud corresponding to each grid in the current occupancy grid map can be, but not limited to be, implemented as follows. For each grid, laser points corresponding to the grid can be determined based on a geographical space range corresponding to the grid and location information of each laser point in the laser point cloud, e.g., by determining the longitude and latitude coordinates of each laser point falls within the geographical space range corresponding to which grid, and determining the laser points that fall within the geographical space range corresponding to each grid as the laser points corresponding to the grid, as shown in FIG. 11.

In an embodiment of the present disclosure, laser points can be divided into a ground type and an obstacle (non-ground) type. In an example, in the step F2, the operation of determining the observed type of the current observation for the grid based on the laser point cloud corresponding to the grid can be, but not limited to be, implemented using any of the following schemes.

Scheme A1: It is determined whether all of the laser points corresponding to the grid are ground, and if so, the observed type of the current observation for the grid is determined as ground; or otherwise the observed type of the current observation for the grid is determined as non-ground. That is, in Scheme A1, the observed type for the grid is determined as non-ground as long as there is a laser point corresponding to the grid that is of the obstacle type.

Scheme A2: A ratio of the number of laser points of the ground type to the total number of laser points corresponding to the gird is calculated. The observed type of the current observation for the grid is determined as ground when the ratio is larger than or equal to a predetermined ratio threshold, or the observed type of the current observation for the grid is determined as non-ground when the ratio is smaller than the predetermined ratio threshold.

In some optional embodiments, in the step F2, the operation of determining the current probability that the grid belongs to each of the occupancy categories based on the previous probability that the grid belongs to the occupancy category and the observed type of the current observation for the grid may include:

when the observed type of the current observation for the grid is ground, setting a current probability that the grid belongs to the ground category to 1 and a current probability that the grid belongs to each of the other occupancy categories to 0; and when the observed type of the current observation for the grid is non-ground, setting the current probability that the grid belongs to the ground category to 0, and determining the current probability that the grid belongs to each of the other occupancy categories based on a previous probability that the grid belongs to the occupancy category and a time interval between a previous observation and the current observation.

In an example, the current probability that the grid belongs to each of the other occupancy categories can be determined according the following Equation (12):

$$p(i \mid z_{1:t}) = p(i \mid z_{1:t-\Delta t})^{\frac{1}{1+\beta\Delta t}} / \sum_j p(j \mid z_{1:t-\Delta t})^{\frac{1}{1+\beta\Delta t}} \quad (12)$$

where $p(i|z_{1:t})$ is the current probability that the grid belongs to the i-th occupancy category, $p(i| z_{1:t-\Delta t})$ is the previous probability that the grid belongs to the i-th occupancy category, $\Delta t$ denotes the time terminal between the previous observation and the current observation, and $\beta$ is a predetermined parameter for adjusting an impact of the time interval on the result.

In an example, the occupancy categories may include a ground category, a static object category and a dynamic object category. If the observed type is ground, the current probabilities that the grid belongs to the ground category, the static object category and the dynamic object category are 1, 0, and 0, respectively. If the observed type is non-ground, the current probability that the grid belongs to the ground category is set to 0, and the current probability that the grid belongs to the static object category and the current probability that the grid belongs to the dynamic object category can be obtained according to the following Equations (13) and (14), respectively:

$$p(S \mid z_{1:t}) = \qquad (13)$$
$$p(S \mid z_{1:t-\Delta t})^{\frac{1}{1+\beta\Delta t}} / \left( p(S \mid z_{1:t-\Delta t})^{\frac{1}{1+\beta\Delta t}} + p(D \mid z_{1:t-\Delta t})^{\frac{1}{1+\beta\Delta t}} \right)$$

where $p(S|z_{1:t})$ is the current probability that the grid belongs to the static object category, $p(S| z_{1:t-\Delta t})$ is the previous probability that the grid belongs to the static object category, $p(D| z_{1:t-\Delta t})$ is the previous probability that the grid belongs to the dynamic object category, $\Delta t$ denotes the time terminal between the previous observation and the current observation, and $\beta$ is a predetermined parameter for adjusting an impact of the time interval on the result.

$$p(D \mid z_{1:t}) = \qquad (14)$$
$$p(D \mid z_{1:t-\Delta t})^{\frac{1}{1+\beta\Delta t}} / \left( p(S \mid z_{1:t-\Delta t})^{\frac{1}{1+\beta\Delta t}} + p(D \mid z_{1:t-\Delta t})^{\frac{1}{1+\beta\Delta t}} \right)$$

where $p(D|z_{1:t})$ is the current probability that the grid belongs to the dynamic object category, $p(S| z_{1:t-\Delta t})$ is the previous probability that the grid belongs to the static object category, $p(D| z_{1:t-\Delta t})$ is the previous probability that the grid belongs to the dynamic object category, $\Delta t$ denotes the time terminal between the previous observation and the current observation, and $\beta$ is a predetermined parameter for adjusting an impact of the time interval on the result.

In some optional embodiments, the occupancy categories may include a static object category, a dynamic object category and a ground category. In the step F2, the operation of determining the current probability that the grid belongs to each of the occupancy categories based on the previous probability that the grid belongs to the occupancy category and the observed type of the current observation for the grid may include:

when the observed type of the current observation for the grid is non-ground, setting a current probability that the grid is occupied to a predetermined confidence level of the laser radar determining non-ground, and determining the current probability that the grid belongs to each of the static object category, the dynamic object category and the ground category based on the current probability that the grid is occupied, a previous probability that the grid belongs to the static object category, a previous probability that the grid belongs to the dynamic object category and a time interval between a previous observation and the current observation; and when the observed type of the current observation for the grid is ground, setting the current probability that the grid is occupied to a predetermined confidence level of the laser radar determining ground, and determining the current probability that the grid belongs to each of the static object category, the dynamic object category and the ground category based on the previous probability that the grid belongs to the static object category, the current probability that the grid is occupied, a previous probability that the grid is occupied and a current observed probability that the grid is occupied.

When the observed type of the current observation for the grid is non-ground, the current probability $p(O|z_{1:t})$ that the grid is occupied is set as $p(O|z_{1:t})=p_{max}$, where $p_{max}$ is a predetermined confidence level of the laser radar determining non-ground. The current probability $p(S|z_{1:t})$ that the grid belongs to the static object category and the current probability $p(D|z_{1:t})$ that the grid belongs to the dynamic object category can be calculated according to the following Equations (15) and (16), respectively:

$$p(S \mid z_{1:t}) = \frac{p(S \mid z_{1:t-\Delta t})^{\frac{1}{1+\beta\Delta t}}}{p(S \mid z_{1:t-\Delta t})^{\frac{1}{1+\beta\Delta t}} + p(D \mid z_{1:t-\Delta t})^{\frac{1}{1+\beta\Delta t}}} \cdot p(O \mid z_{1:t}) \quad (15)$$

$$p(D \mid z_{1:t}) = p(O \mid z_{1:t}) - p(S \mid z_{1:t}) \quad (16)$$

where in Equation (15), $p(S| z_{1:t-\Delta t})$ is the previous probability that the grid belongs to the static object category, $p(D| z_{1:t-\Delta t})$ is the previous probability that the grid belongs to the dynamic object category, $\Delta t$ denotes the time terminal between the previous observation and the current observation, and $\beta$ is a predetermined parameter for adjusting an impact of the time interval on the result.

When the observed type of the current observation for the grid is ground, the current probability $p(O|z_t)$ that the grid is occupied is set as $p(O|z_t)=p_{min}$, where $p_{min}$ is a predetermined confidence level of the laser radar determining ground. The current probability $p(O|z_{1:t})$ that the grid is occupied can be calculated according to the following Equations (17) and (18):

$$l(O|z_{1:t})=l(O| z_{1:t-\Delta t})+\lambda l(O|z_t) \quad (17)$$

$$p(O|z_{1:t})=e^{l(O|z_{1:t})}(1+e^{l(O|z_{1:t})}) \quad (18)$$

where $\lambda$ in Equation (17) is a predetermined constant dependent on a type of the sensor.

The current probability that the grid belongs to the static object category and the current probability that the grid belongs to the dynamic object category can be calculated according to the following Equations (19) and (20):

$$p(S|z_{1:t}) = p(O|z_{1:t}) \cdot \frac{w_{t-\Delta t} \cdot p(S|z_{1:t-\Delta t}) + w_t \cdot p(S|z_t)}{w_{t-\Delta t} \cdot p(O|z_{1:t-\Delta t}) + w_t \cdot p(O|z_t)} \quad (19)$$

$$p(D|z_{1:t}) = p(O|z_{1:t}) - p(S|z_{1:t}) \quad (20)$$

where $w_t$ and $w_{t-\Delta t}$ in Equation (19) are the weight for the current observed probability that the grid belongs to the static object category and the weight for the previous probability that the grid belongs to the static object category, respectively, as represented in the following Equation (21):

$$w_{t-\Delta t} = \max(\varepsilon, p(S|z_{1:t-\Delta t})) \cdot e^{-\Delta t/\tau} \quad (21)$$

$$w_t = 1 - w_{t-\Delta t}$$

where $p(S|z_{1:t-\Delta t})$ is the previous probability that the grid belongs to the static object category, $\Delta t$ denotes the time interval between the previous observation and the current observation, and $\tau$ is a predetermined empirical value.

Figure 12:
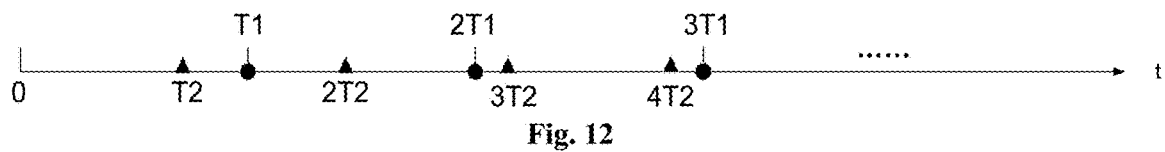
FIG. 12 is a schematic diagram showing a time period for updating an occupancy grid map by fusing images and laser point clouds.

As shown in FIG. 12, it is assumed that there are two sensors, with one sensor being a vehicle mounted camera transmitting images at a period of $T_1$, and the other sensor being a laser radar transmitting laser point clouds at a period of $T_2$. Assuming that a time difference between a current observation and a current update is ignorable and thus the time of the current observation is considered to be identical to the time of the current update of the occupancy grid map, the vehicle mounted camera performs observations at the period of $T_1$, and the laser radar performs observations at the period of $T_2$. The vehicle mounted camera performs the current observation and updates the current occupancy grid map at time $T_1$, and the corresponding previous observation is the observation by the laser radar at time $T_2$. That is, the time interval between the current observation by the camera at the time $T_1$ and the previous observation is $T_1-T_2$. The current occupancy grid map the camera needs to update at the time $T_1$ is the current occupancy grid map the laser radar has updated at the time $T_2$. Similarly, at time $2T_2$, for the laser radar, the corresponding previous observation is the observation by the camera at the time $T_1$. That is, the time interval between the current observation by the laser radar at the time $2T_2$ and the previous observation is $2T_2-T_1$. The current occupancy grid map the laser radar needs to update at the time $T_2$ is the current occupancy grid map the camera has updated at the time $T_1$, and so on.

Figure 13:
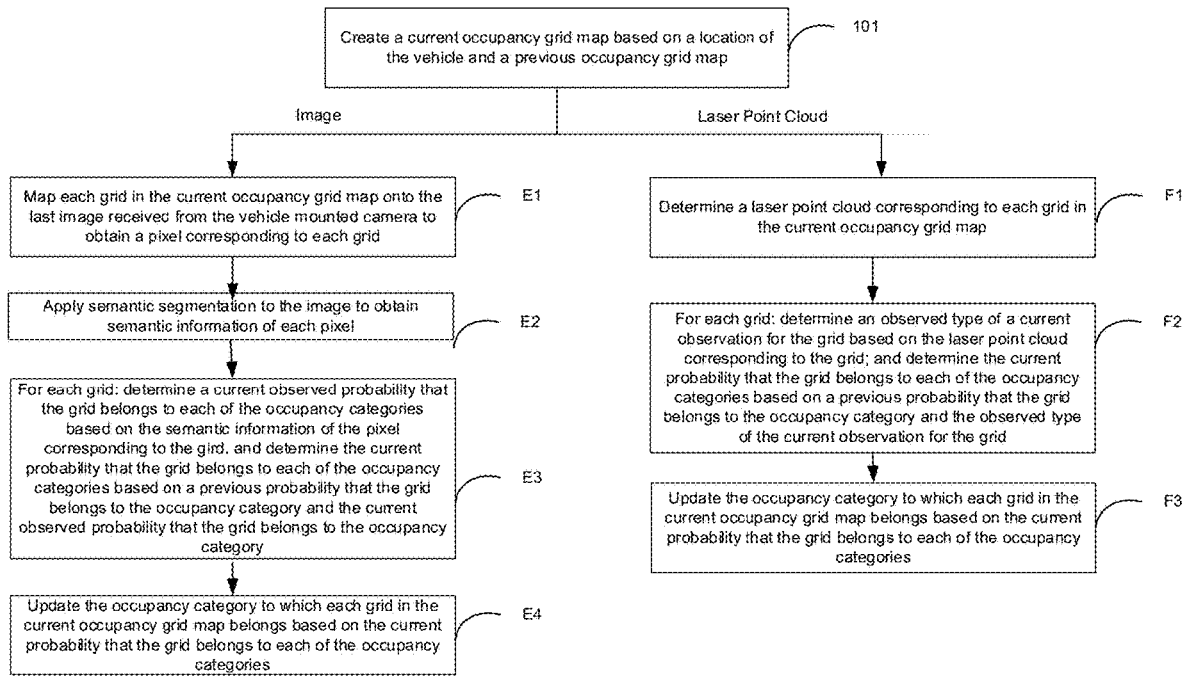
FIG. 13 is a flowchart illustrating a method for updating an occupancy grid map by fusing images and laser point clouds.

Assuming that a camera and a laser radar are provided, a process for updating an occupancy grid map based on images captured by the camera and laser point clouds collected by the laser radar is shown in FIG. 13.

Embodiment 2

Figure 14:
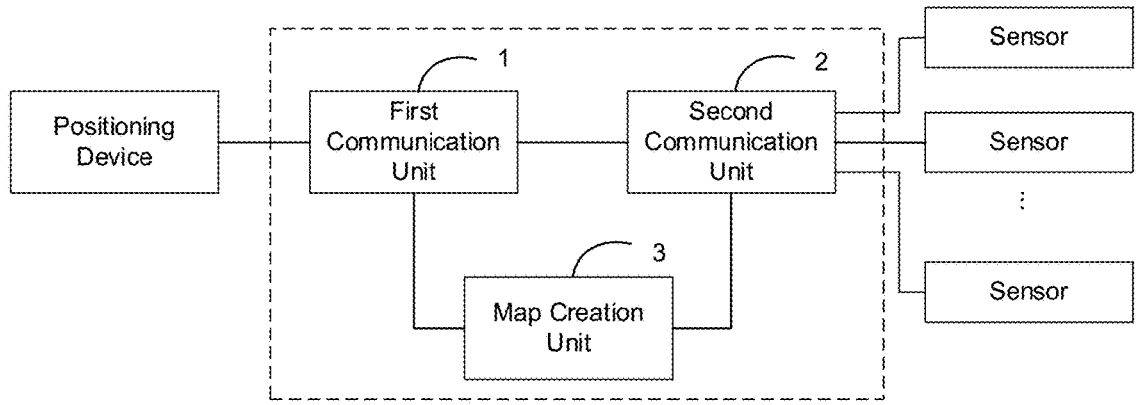
FIG. 14 is a first schematic diagram showing a structure of an apparatus for creating an occupancy grid map according to an embodiment of the present disclosure.

Based on the same concept as the method for creating the occupancy grid map according to Embodiment 1, Embodiment 2 of the present disclosure provides an apparatus for creating an occupancy grid map. The apparatus is communicatively connected to a vehicle mounted positioning device and at least two sensors provided on a vehicle. The apparatus has a structure shown in FIG. 14. The apparatus includes: a first communication unit 1 communicatively connected to the vehicle mounted positioning device, at least two second communication units 2 and a map creation unit 3. The number of second communication units 2 is the same as the number of sensors. Each of the second communication units 2 is communicatively connected to one of the sensors. The first communication unit 1 is configured to receive a location of the vehicle from the vehicle mounted positioning device and transmit the location of the vehicle to the map creation unit 3.

The second communication units 2 are configured to receive environment perception information from the sensors and transmit the environment perception information to the map creation unit 3.

The map creation unit 3 is configured to create a current occupancy grid map based on the location of the vehicle and a previous occupancy grid map, and determine a current probability that each grid in the current occupancy grid map belongs to each of occupancy categories based on last environment perception information received from the sensors and update an occupancy category to which each grid in the current occupancy grid map belongs based on the current probability that the grid belongs to each of the occupancy categories, in accordance with an asynchronous updating policy.

Figure 15:
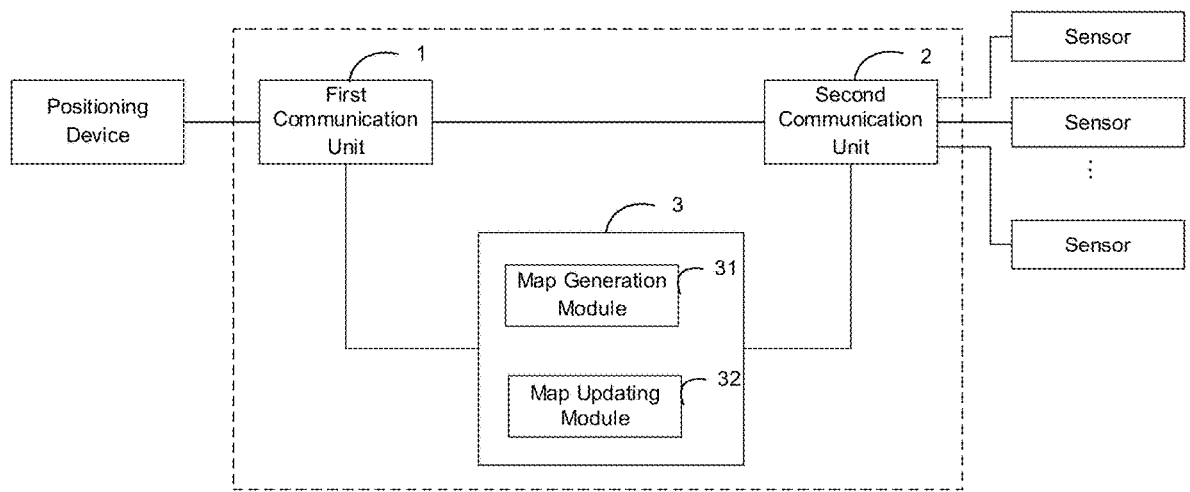
FIG. 15 is a second schematic diagram showing a structure of an apparatus for creating an occupancy grid map according to an embodiment of the present disclosure.

In some optional embodiments, the map creation unit 3 may have a structure shown in FIG. 15 and include:

a map generation module 31 configured to create the current occupancy grid map based on the location of the vehicle and the previous occupancy grid map; and a map updating module 32 configured to determine the current probability that each grid in the current occupancy grid map belongs to each of occupancy categories based on the last environment perception information received from the sensors and update an occupancy category to which each grid in the current occupancy grid map belongs based on the current probability that the grid belongs to each of the occupancy categories, in accordance with the asynchronous updating policy.

In some optional embodiments, the map generation module 31 can be configured to create an initial occupancy grid map based on the location of the vehicle each time the location of the vehicle is received; and obtain the current occupancy grid map by updating an occupancy category to which each grid in the initial occupancy grid map belongs based on an occupancy category to which a corresponding grid in the previous occupancy grid map belongs. For further details, reference can be made to the corresponding content in Embodiment 1 and description thereof will be omitted here.

In some optional embodiments, the map updating module 32 can be further configured to: prior to determining the current probability that each grid in the current occupancy grid map belongs to each of the occupancy categories based on the last environment perception information received from the sensors: calculate a time difference between time at which the last environment perception information is received from the sensors and time at which a last location of the vehicle is received; determine whether the time difference is smaller than or equal to a predetermined time length threshold; and if so, perform the step of determining the current probability that each grid in the current occupancy grid map belongs to each of the occupancy categories based on the last environment perception information received from the sensors; or otherwise ignore the last environment perception information received from the sensors.

In some optional embodiments, the map generation module 31 can be configured to determine a last received location of the vehicle each time the environment perception information is received from one of the sensors and creating an initial occupancy grid map based on the location of the vehicle; and obtain the current occupancy grid map by updating an occupancy category to which each grid in the initial occupancy grid map belongs based on an occupancy category to which a corresponding grid in the previous occupancy grid map belongs. For further details, reference can be made to the corresponding content in Embodiment 1 and description thereof will be omitted here.

In some optional embodiments, at least one of the sensors is a vehicle mounted camera configured to capture an image as the environment perception information. With a last image received from the vehicle mounted camera, the map updating module determining the current probability that each grid in the current occupancy grid map belongs to each of the occupancy categories based on the last environment perception information received from the sensors may include: mapping each grid in the current occupancy grid map onto the last image received from the vehicle mounted camera to obtain a pixel corresponding to each grid; applying semantic segmentation to the image to obtain semantic information of each pixel; and for each grid: determining a current observed probability that the grid belongs to each of the occupancy categories based on the semantic information of the pixel corresponding to the gird, and determining the current probability that the grid belongs to each of the occupancy categories based on a previous probability that the grid belongs to the occupancy category and the current observed probability that the grid belongs to the occupancy category. For further details, reference can be made to the corresponding content in Embodiment 1 and description thereof will be omitted here.

In some optional embodiments, the map generation module 31 creating the initial occupancy grid map based on the location of the vehicle may include: creating a first occupancy grid map in a vehicle body coordinate system based on the location of the vehicle; assigning an initial height value to each grid in the first occupancy grid map based on a height of an origin of the vehicle body coordinate system with respect to a ground; and obtaining the initial occupancy grid map by modifying the initial height value of each grid in the first occupancy grid map based on a predetermined terrain map. The map updating module 32 mapping each grid in the current occupancy grid map onto the last image received from the vehicle mounted camera may include: converting the current occupancy grid map into a camera coordinate system of the vehicle mounted camera based on an external reference between the predetermined vehicle body coordinate system and the camera coordinate system; and mapping the current occupancy grid map in the camera coordinate system onto the image based on an internal reference of the vehicle mounted camera, to obtain the pixel corresponding to each grid. For further details, reference can be made to the corresponding content in Embodiment 1 and description thereof will be omitted here.

In some optional embodiments, the map generation module 31 creating the initial occupancy grid map based on the location of the vehicle may include: creating the initial occupancy grid map based on the location of the vehicle in a terrain map. The map updating module 32 mapping each grid in the current occupancy grid map onto the last image received from the vehicle mounted camera may include: determining an external reference between a coordinate system of the terrain map and a camera coordinate system of the vehicle mounted camera; converting the current occupancy grid map into the camera coordinate system of the vehicle mounted camera based on the external reference; and mapping the current occupancy grid map in the camera coordinate system onto the image based on an internal reference of the vehicle mounted camera, to obtain the pixel corresponding to each grid.

In some optional embodiments, the semantic information can be a representative characteristic value for the pixel to belong to each of semantic categories. The map updating module 32 determining the current observed probability that the grid belongs to each of the occupancy categories based on the semantic information of the pixel corresponding to the gird may include: determining a probability that the pixel corresponding to the grid belongs to each of the semantic categories based on the representative characteristic value for the pixel to belong to the semantic category; and for each of the occupancy categories: determining a target semantic category corresponding to the occupancy category based on a predetermined correspondence between the semantic categories and the occupancy categories, and using a sum of the probabilities that the pixel belongs to respective target semantic categories as the current observed probability that the grid belongs to the occupancy category.

In some optional embodiments, the map updating module 32 determining the current probability that the grid belongs to each of the occupancy categories based on the previous probability that the grid belongs to the occupancy category and the current observed probability that the grid belongs to the occupancy category may include: determining a weight for the previous probability that the grid belongs to the occupancy category and a weight for the current observed probability that the grid belongs to the occupancy category based on the previous probability that the grid belongs to the occupancy category, the current observed probability that the grid belongs to the occupancy category and a time interval between a previous observation and a current observation of the current occupancy grid map; and for each of the occupancy categories: calculating a weighted sum of the previous probability that the grid belongs to the occupancy category and the current observed probability that the grid belongs to the occupancy category, so as to obtain the current probability that the grid belongs to the occupancy category.

In some optional embodiments, the occupancy categories may include a static object category, a dynamic object category and a road surface. The map updating module 32 determining the current probability that the grid belongs to each of the occupancy categories based on the previous probability that the grid belongs to the occupancy category and the current observed probability that the grid belongs to the occupancy category may include: obtaining a current observed probability that the grid is occupied based on the current observed probability that the grid belongs to the static object category and the current observed probability that the grid belongs to the dynamic object category; obtaining a current observed probability that the grid is occupied based on the current observed probability that the grid belongs to the static object category and the current observed probability that the grid belongs to the dynamic object category; determining a current probability that the grid is occupied based on the current observed probability that the grid is occupied and a previous probability that the grid is occupied; and calculating the current probability that the grid belongs to each of the occupancy categories based on the current observed probability that the grid belongs to the static object category, a previous probability that the grid belongs to the static object category, the current observed probability that the grid is occupied, the previous probability that the grid is occupied, and the current probability that the grid is occupied.

In some optional embodiments, at least one of the sensors can be a laser radar configured to capture a laser point cloud as the environment perception information. With a last laser point cloud received from the laser radar, the map updating module 32 determining the current probability that each grid in the current occupancy grid map belongs to each of the occupancy categories based on the last environment perception information received from the sensors may include: determining a laser point cloud corresponding to each grid in the current occupancy grid map; and for each grid: determining an observed type of a current observation for the grid based on the laser point cloud corresponding to the grid; and determining the current probability that the grid belongs to each of the occupancy categories based on a previous probability that the grid belongs to the occupancy category and the observed type of the current observation for the grid.

In some optional embodiments, the occupancy categories may include a static object category, a dynamic object category and a ground category. The map updating module determining the current probability that the grid belongs to each of the occupancy categories based on the previous probability that the grid belongs to the occupancy category and the observed type of the current observation for the grid may include: when the observed type of the current observation for the grid is non-ground, setting a current probability that the grid is occupied to a predetermined confidence level of the laser radar determining non-ground, and determining the current probability that the grid belongs to each of the static object category, the dynamic object category and the ground category based on the current probability that the grid is occupied, a previous probability that the grid belongs to the static object category, a previous probability that the grid belongs to the dynamic object category and a time interval between a previous observation and the current observation; and when the observed type of the current observation for the grid is ground, setting the current probability that the grid is occupied to a predetermined confidence level of the laser radar determining ground, and determining the current probability that the grid belongs to each of the static object category, the dynamic object category and the ground category based on the previous probability that the grid belongs to the static object category, the current probability that the grid is occupied, a previous probability that the grid is occupied and a current observed probability that the grid is occupied.

In some optional embodiments, the map updating module 32 determining the current probability that the grid belongs to each of the occupancy categories based on the previous probability that the grid belongs to the occupancy category and the observed type of the current observation for the grid may include: when the observed type of the current observation for the grid is ground, setting a current probability that the grid belongs to the ground category to 1 and a current probability that the grid belongs to each of the other occupancy categories to 0; and when the observed type of the current observation for the grid is non-ground, setting the current probability that the grid belongs to the ground category to 0, and determining the current probability that the grid belongs to each of the other occupancy categories based on a previous probability that the grid belongs to the occupancy category and a time interval between a previous observation and the current observation. For further details, reference can be made to the corresponding content in Embodiment 1 and description thereof will be omitted here.

Embodiment 3

Figure 16:
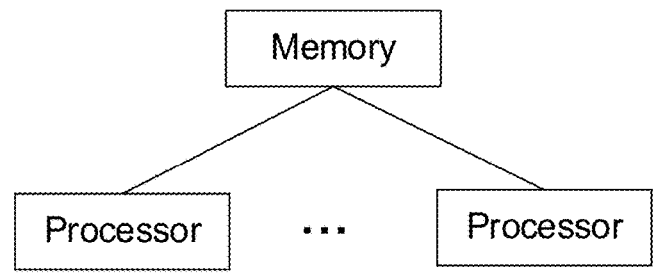
FIG. 16 is a schematic diagram showing a structure of a processing apparatus according to an embodiment of the present disclosure.

Embodiment 3 of the present disclosure provides a processing apparatus, as shown in FIG. 16. The processing apparatus includes a memory and one or more processors communicatively connected to the memory. The memory stores instructions executable by the one or more processors. The instructions, when executed by the one or more processors, cause the one or more processors to perform any of the above methods for creating an occupancy grid map as described in connection with Embodiment 1

According to an embodiment of the present disclosure, a non-volatile storage medium is provided. The non-volatile storage medium stores at least one machine executable instruction which, when executed by a processor, causes the processor to perform the above method for creating an occupancy grid map.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for creating an occupancy grid map, with at least two sensors provided on a vehicle, at least one of the sensors being a vehicle mounted camera configured to capture an image as a first part of environment perception information, the method comprising:
   creating a current occupancy grid map based on a location of the vehicle and a previous occupancy grid map;
   determining a current probability that each grid in the current occupancy grid map belongs to each of occupancy categories based on last received first part of the environment perception information, the determining comprising:
     for each grid: determining the current probability that the grid belongs to each of the occupancy categories based on semantic information of a pixel corresponding to the grid, wherein the pixel is obtained from a last image received from the vehicle mounted camera; and
   updating an occupancy category to which each grid in the current occupancy grid map belongs based on the current probability that the grid belongs to each of the occupancy categories, in accordance with an asynchronous updating policy.

2. The method of claim 1, wherein said creating the current occupancy grid map based on the location of the vehicle and the previous occupancy grid map comprises:
   creating an initial occupancy grid map based on the location of the vehicle each time the location of the vehicle is received; and
   obtaining the current occupancy grid map by updating an occupancy category to which each grid in the initial occupancy grid map belongs based on an occupancy category to which a corresponding grid in the previous occupancy grid map belongs.

3. The method of claim 2, further comprising, prior to the determining of the current probability that each grid in the current occupancy grid map belongs to each of the occupancy categories based on the last received first part of the environment perception information:
   calculating a time difference between time at which the last received first part of the environment perception information is received from the sensors and time at which a last location of the vehicle is received;
   upon determining that the time difference is smaller than or equal to a predetermined time length threshold, performing the determining of the current probability that each grid in the current occupancy grid map belongs to each of the occupancy categories based on the last received first part of the environment perception information; and
   upon determining that the time difference is greater than the predetermined time length threshold, ignoring the last received first part of the environment perception information.

4. The method of claim 1, wherein said creating the current occupancy grid map based on the location of the vehicle and the previous occupancy grid map comprises:
   determining a last received location of the vehicle each time the first part of the environment perception information is received from one of the sensors and creating an initial occupancy grid map based on the location of the vehicle; and
   obtaining the current occupancy grid map by updating an occupancy category to which each grid in the initial occupancy grid map belongs based on an occupancy category to which a corresponding grid in the previous occupancy grid map belongs.

5. The method of claim 1, wherein said determining the current probability that each grid in the current occupancy grid map belongs to each of the occupancy categories based on the last received first part of the environment perception information further comprises:
   mapping each grid in the current occupancy grid map onto a last image received from the vehicle mounted camera to obtain the pixel corresponding to each grid; and
   applying semantic segmentation to the image to obtain the semantic information of each pixel, wherein for each grid, said determining the current probability that the grid belongs to each of the occupancy categories based on the semantic information of the pixel corresponding to the grid comprises:
   determining a current observed probability that the grid belongs to each of the occupancy categories based on the semantic information of the pixel corresponding to the grid; and determining the current probability that the grid belongs to each of the occupancy categories based on: a previous probability that the grid belongs to the occupancy category, and the current observed probability that the grid belongs to the occupancy category.

6. The method of claim 5, wherein said creating the current occupancy grid map based on the location of the vehicle and the previous occupancy grid map comprises creating an initial occupancy grid map based on the location of the vehicle, further wherein:
   said creating the initial occupancy grid map based on the location of the vehicle comprises:
     creating a first occupancy grid map in a vehicle body coordinate system based on the location of the vehicle;
     assigning an initial height value to each grid in the first occupancy grid map based on a height of an origin of the vehicle body coordinate system with respect to a ground; and obtaining the initial occupancy grid map by modifying the initial height value of each grid in the first occupancy grid map based on a predetermined terrain map, and said mapping each grid in the current occupancy grid map onto the last image received from the vehicle mounted camera comprises:

converting the current occupancy grid map into a camera coordinate system of the vehicle mounted camera based on an external reference between the predetermined vehicle body coordinate system and the camera coordinate system; and mapping the current occupancy grid map in the camera coordinate system onto the image based on an internal reference of the vehicle mounted camera, to obtain the pixel corresponding to each grid.

7. The method of claim 5, wherein said creating the current occupancy grid map based on the location of the vehicle and the previous occupancy grid map comprises creating an initial occupancy grid map based on the location of the vehicle, and further wherein:

said creating the initial occupancy grid map based on the location of the vehicle comprises:

creating the initial occupancy grid map based on the location of the vehicle in a terrain map, and said mapping each grid in the current occupancy grid map onto the last image received from the vehicle mounted camera comprises:

determining an external reference between a coordinate system of the terrain map and a camera coordinate system of the vehicle mounted camera;

converting the current occupancy grid map into the camera coordinate system of the vehicle mounted camera based on the external reference; and mapping the current occupancy grid map in the camera coordinate system onto the image based on an internal reference of the vehicle mounted camera, to obtain the pixel corresponding to each grid.

8. The method of claim 5, wherein the semantic information is a representative characteristic value for the pixel to belong to each of semantic categories, and said determining the current observed probability that the grid belongs to each of the occupancy categories based on the semantic information of the pixel corresponding to the grid comprises:

determining a probability that the pixel corresponding to the grid belongs to each of the semantic categories based on the representative characteristic value for the pixel to belong to the semantic category; and for each of the occupancy categories: determining a target semantic category corresponding to the occupancy category based on a predetermined correspondence between the semantic categories and the occupancy categories, and using a sum of the probabilities that the pixel belongs to respective target semantic categories as the current observed probability that the grid belongs to the occupancy category.

9. The method of claim 5, wherein said determining the current probability that the grid belongs to each of the occupancy categories based on the previous probability that the grid belongs to the occupancy category and the current observed probability that the grid belongs to the occupancy category comprises:

determining a weight for the previous probability that the grid belongs to the occupancy category and a weight for the current observed probability that the grid belongs to the occupancy category based on the previous probability that the grid belongs to the occupancy category, the current observed probability that the grid belongs to the occupancy category and a time interval between a previous observation and a current observation of the current occupancy grid map; and for each of the occupancy categories:

calculating a weighted sum of the previous probability that the grid belongs to the occupancy category and the current observed probability that the grid belongs to the occupancy category, so as to obtain the current probability that the grid belongs to the occupancy category.

10. The method of claim 5, wherein the occupancy categories comprise a static object category, a dynamic object category and a road surface, and said determining the current probability that the grid belongs to each of the occupancy categories based on the previous probability that the grid belongs to the occupancy category and the current observed probability that the grid belongs to the occupancy category comprises:

obtaining a current observed probability that the grid is occupied based on the current observed probability that the grid belongs to the static object category and the current observed probability that the grid belongs to the dynamic object category;

obtaining a current observed probability that the grid is occupied based on the current observed probability that the grid belongs to the static object category and the current observed probability that the grid belongs to the dynamic object category;

determining a current probability that the grid is occupied based on the current observed probability that the grid is occupied and a previous probability that the grid is occupied; and calculating the current probability that the grid belongs to each of the occupancy categories based on the current observed probability that the grid belongs to the static object category, a previous probability that the grid belongs to the static object category, the current observed probability that the grid is occupied, the previous probability that the grid is occupied, the current probability that the grid is occupied and a time interval between a previous observation and a current observation.

11. The method of claim 1, wherein at least one of the sensors is a laser radar configured to capture a laser point cloud as a second part of the environment perception information, and with a last laser point cloud received from the laser radar, said determining the current probability that each grid in the current occupancy grid map belongs to each of the occupancy categories based on the last received second part of the environment perception information comprises:

determining a laser point cloud corresponding to each grid in the current occupancy grid map; and for each grid:

determining an observed type of a current observation for the grid based on the laser point cloud corresponding to the grid; and determining the current probability that the grid belongs to each of the occupancy categories based on a previous probability that the grid belongs to the occupancy category and the observed type of the current observation for the grid.

12. The method of claim 11, wherein the occupancy categories comprise a static object category, a dynamic object category and a ground category, and said determining the current probability that the grid belongs to each of the occupancy categories based on the previous probability that the grid belongs to the occupancy category and the observed type of the current observation for the grid comprises:

when the observed type of the current observation for the grid is non-ground, setting a current probability that the grid is occupied to a predetermined confidence level of the laser radar determining non-ground, and determining the current probability that the grid belongs to each of the static object category, the dynamic object category and the ground category based on the current probability that the grid is occupied, a previous probability that the grid belongs to the static object category, a previous probability that the grid belongs to the dynamic object category and a time interval between a previous observation and the current observation; and when the observed type of the current observation for the grid is ground, setting the current probability that the grid is occupied to a predetermined confidence level of the laser radar determining ground, and determining the current probability that the grid belongs to each of the static object category, the dynamic object category and the ground category based on the previous probability that the grid belongs to the static object category, the current probability that the grid is occupied, a previous probability that the grid is occupied and a current observed probability that the grid is occupied.

13. The method of claim 11, wherein said determining current probability that the grid belongs to each of the occupancy categories based on the previous probability that the grid belongs to the occupancy category and the observed type of the current observation for the grid comprises:

when the observed type of the current observation for the grid is ground, setting a current probability that the grid belongs to the ground category to 1 and a current probability that the grid belongs to each of the other occupancy categories to 0; and when the observed type of the current observation for the grid is non-ground, setting the current probability that the grid belongs to the ground category to 0, and determining the current probability that the grid belongs to each of the other occupancy categories based on a previous probability that the grid belongs to the occupancy category and a time interval between a previous observation and the current observation.

14. An apparatus, comprising a memory and one or more processors communicatively connected to the memory, the memory storing instructions executable by the one or more processors, the instructions, when executed by the one or more processors, causing the one or more processors to perform a method for creating an occupancy grid map, with at least two sensors provided on a vehicle, at least one of the sensors being a vehicle mounted camera configured to capture an image as environment perception information, the method comprising:

creating a current occupancy grid map based on a location of the vehicle and a previous occupancy grid map;

determining a current probability that each grid in the current occupancy grid map belongs to each of occupancy categories based on last received environment perception information, comprising:

for each grid: determining the current probability that the grid belongs to each of the occupancy categories based on semantic information of a pixel corresponding to the grid, wherein the pixel is obtained from a last image received from the vehicle mounted camera; and updating an occupancy category to which each grid in the current occupancy grid map belongs based on the current probability that the grid belongs to each of the occupancy categories, in accordance with an asynchronous updating policy.

15. The apparatus of claim 14, wherein said creating the current occupancy grid map based on the location of the vehicle and the previous occupancy grid map comprises:

creating an initial occupancy grid map based on the location of the vehicle each time the location of the vehicle is received; and obtaining the current occupancy grid map by updating an occupancy category to which each grid in the initial occupancy grid map belongs based on an occupancy category to which a corresponding grid in the previous occupancy grid map belongs.

16. The apparatus of claim 15, wherein the method further comprises, prior to the determining of the current probability that each grid in the current occupancy grid map belongs to each of the occupancy categories based on the last received environment perception information:

calculating a time difference between time at which the last received environment perception information is received from the sensors and time at which a last location of the vehicle is received;

upon determining that the time difference is smaller than or equal to a predetermined time length threshold, performing the determining of the current probability that each grid in the current occupancy grid map belongs to each of the occupancy categories based on the last received environment perception information; and upon determining that the time difference is greater than the predetermined time length threshold, ignoring the last received environment perception information.

17. The apparatus of claim 14, wherein said creating the current occupancy grid map based on the location of the vehicle and the previous occupancy grid map comprises:

determining a last received location of the vehicle each time the environment perception information is received from one of the sensors and creating an initial occupancy grid map based on the location of the vehicle; and obtaining the current occupancy grid map by updating an occupancy category to which each grid in the initial occupancy grid map belongs based on an occupancy category to which a corresponding grid in the previous occupancy grid map belongs.

18. A non-transitory computer readable storage medium, storing at least one machine executable instruction which, when executed by a processor, causes the processor to perform a method for creating an occupancy grid map, with at least two sensors provided on a vehicle, at least one of the sensors being a vehicle mounted camera configured to capture an image as environment perception information, the method comprising:

creating a current occupancy grid map based on a location of the vehicle and a previous occupancy grid map;

determining a current probability that each grid in the current occupancy grid map belongs to each of occupancy categories based on last received environment perception information, comprising:

for each grid: determining the current probability that the grid belongs to each of the occupancy categories based on semantic information of a pixel corresponding to the grid, wherein the pixel is obtained from a last image received from the vehicle mounted camera; and updating an occupancy category to which each grid in the current occupancy grid map belongs based on the current probability that the grid belongs to each of the occupancy categories, in accordance with an asynchronous updating policy.

19. The non-transitory computer readable storage medium of claim 18, wherein said creating the current occupancy grid map based on the location of the vehicle and the previous occupancy grid map comprises:

creating an initial occupancy grid map based on the location of the vehicle each time the location of the vehicle is received; and obtaining the current occupancy grid map by updating an occupancy category to which each grid in the initial occupancy grid map belongs based on an occupancy category to which a corresponding grid in the previous occupancy grid map belongs.

20. The non-transitory computer readable storage medium of claim 19, wherein the method further comprises, prior to the determining of the current probability that each grid in the current occupancy grid map belongs to each of the occupancy categories based on the last received environment perception information:

calculating a time difference between time at which the last received environment perception information is received from the sensors and time at which a last location of the vehicle is received;

upon determining that the time difference is smaller than or equal to a predetermined time length threshold, performing the determining of the current probability that each grid in the current occupancy grid map belongs to each of the occupancy categories based on the last received environment perception information; and upon determining that the time difference is greater than the predetermined time length threshold, ignoring the last received environment perception information.

\* \* \* \* \*

UNITED STATES PATENT AND TRADEMARK OFFICE
CERTIFICATE OF CORRECTION

PATENT NO. : 11,630,210 B2  
APPLICATION NO. : 16/711231  
DATED : April 18, 2023  
INVENTOR(S) : Xuan Lin et al.

Page 1 of 1

It is certified that error appears in the above-identified patent and that said Letters Patent is hereby corrected as shown below:

In the Specification

- In Column 8, Line 52, delete "Zi" and insert -- $Z_i$ --, therefor.

- In Column 9, Line 11, delete "Zi" and insert -- $Z_i$ --, therefor.

- In Column 9, Line 37, delete "p(D| $Z_{1:t-\Delta t}$ )," and insert -- p(D| $Z_{1:t-\Delta t}$), --, therefor.

- In Column 9, Line 37, delete "p(S $Z_{1:t-\Delta t}$ )," and insert -- p(S|$Z_{1:t-\Delta t}$ ), --, therefor.

Signed and Sealed this  
Fifth Day of September, 2023

Katherine Kelly Vidal  
*Director of the United States Patent and Trademark Office*